(12) United States Patent
Wibben et al.

(10) Patent No.: US 10,495,059 B2
(45) Date of Patent: Dec. 3, 2019

(54) METHOD FOR CONTROLLING A ROTOR BLADE ADJUSTMENT DEVICE

(71) Applicant: SSB Wind Systems GmbH & Co. KG, Salzbergen (DE)

(72) Inventors: Norbert Wibben, Salzbergen (DE); Tobias Bültel, Rheine (DE); Fabio Bertolotti, Bad Bentheim (DE)

(73) Assignee: NIDEC SSB Wind Systems GmbH, Salzbergen (DE)

( * ) Notice: Subject to any disclaimer, the term of this patent is extended or adjusted under 35 U.S.C. 154(b) by 153 days.

(21) Appl. No.: 15/570,895

(22) PCT Filed: Jul. 1, 2016

(86) PCT No.: PCT/EP2016/065622
§ 371 (c)(1),
(2) Date: Oct. 31, 2017

(87) PCT Pub. No.: WO2017/001695
PCT Pub. Date: Jan. 5, 2017

(65) Prior Publication Data
US 2018/0291871 A1    Oct. 11, 2018

(30) Foreign Application Priority Data
Jul. 2, 2015  (DE) .................. 10 2015 110 715

(51) Int. Cl.
*F03D 7/02* (2006.01)
*F03B 17/06* (2006.01)
*F03B 15/00* (2006.01)

(52) U.S. Cl.
CPC ............ *F03D 7/0224* (2013.01); *F03B 15/00* (2013.01); *F03B 17/061* (2013.01);
(Continued)

(58) Field of Classification Search
CPC ...... F03D 7/0224; F03D 7/0244; F03B 15/00; F03B 17/061; F05B 2260/70;
(Continued)

(56) References Cited

U.S. PATENT DOCUMENTS 7,764,029 B2   7/2010  Buente et al.
8,157,523 B2   4/2012  Warfen et al.
(Continued)

FOREIGN PATENT DOCUMENTS

DE   102006049490 A1   4/2008
DE   102009025819 A1   11/2010
(Continued)

OTHER PUBLICATIONS

International Search Report (in English and German) and Written Opinion (in German) of the International Searching Authority issued in PCT/EP2016/065622, dated Oct. 7, 2016, ISA/EPO, Rijswijk.

*Primary Examiner* — Justin D Seabe
*Assistant Examiner* — Adam W Brown
(74) *Attorney, Agent, or Firm* — Harness, Dickey & Pierce, P.L.C.

(57) ABSTRACT

Method for controlling a rotor blade adjustment device (14) of a wind turbine or water hydroelectric powerplant (1), wherein the rotor blade adjustment device (14) has a drive (20) which is connected to a rotor blade (8) which is subjected to a flow of wind or water and has the purpose of rotating the rotor blade (8) about a rotor blade axis (15) relative to a rotor hub (7) on which the rotor blade (8) is mounted so as to be rotatable about the rotor blade axis (15), and an electromagnetic brake (34) which is connected to the rotor blade (8) and has the purpose of blocking rotation of the rotor blade (8) about the rotor blade axis (15), wherein the brake (34) is actuated in order to change its activation (Continued)

Figure 1:
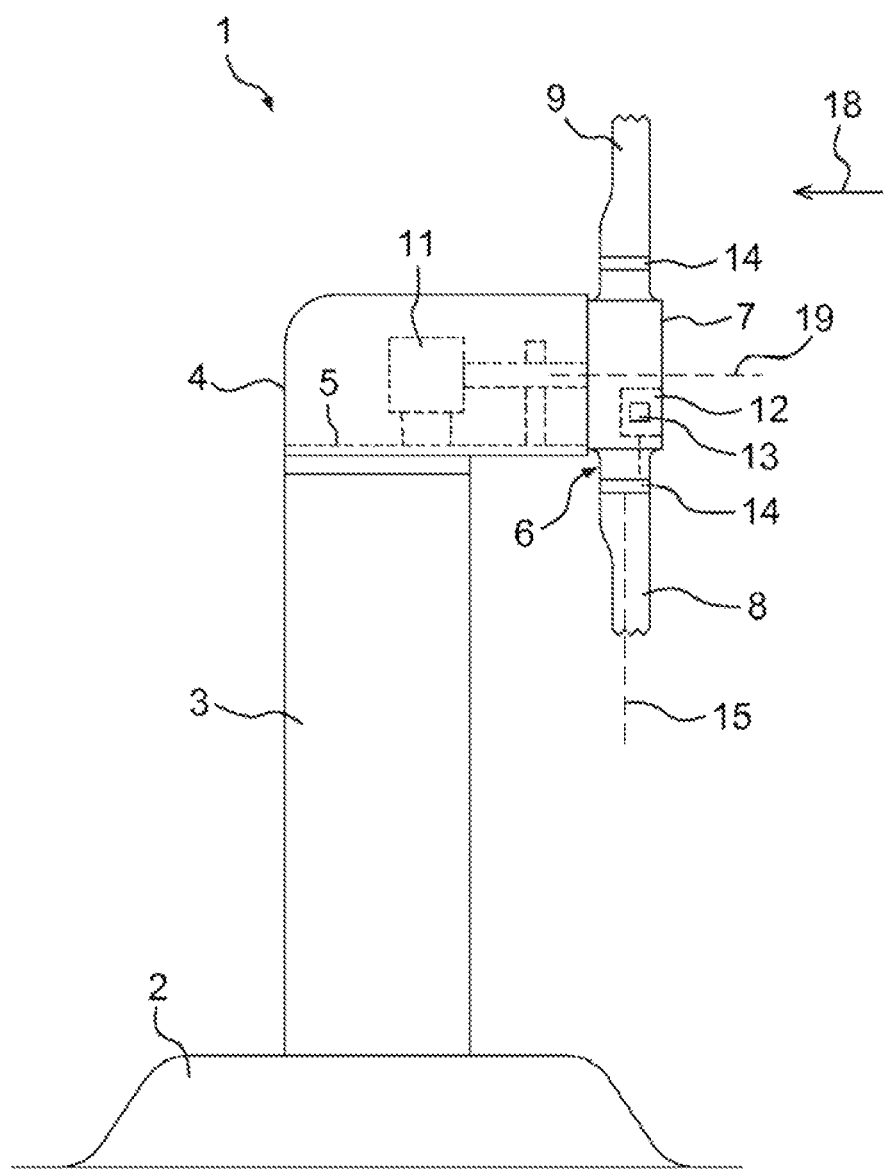

state at a brake activation time ($t_B$), wherein the drive (20) is actuated to change its driving state at a drive activation time ($t_A$) which has a predetermined chronological offset ($\Delta t_V$) with respect to the brake activation time ($t_B$), and wherein an electric current ($I_B$) which flows through the brake (34) is measured, the form of the resulting current/time curve is evaluated, and the chronological offset ($\Delta t_V$) is newly determined and/or adapted as a function of the result of this evaluation.

15 Claims, 4 Drawing Sheets

(52) U.S. Cl.
CPC ........ *F03D 7/0244* (2013.01); *F05B 2260/70* (2013.01); *F05B 2260/76* (2013.01); *F05B 2260/902* (2013.01); *F05B 2270/309* (2013.01); *F05B 2270/602* (2013.01); *Y02E 10/28* (2013.01); *Y02E 10/721* (2013.01); *Y02E 10/723* (2013.01)

(58) Field of Classification Search
CPC .......... F05B 2270/309; F05B 2260/902; F05B 2260/76; F05B 2270/602; Y02E 10/28; Y02E 10/723; Y02E 10/721
See application file for complete search history.

(56) References Cited

U.S. PATENT DOCUMENTS

| | | | |
|---|---|---|---|
| 2010/0068057 A1* | 3/2010 | Friedrich | F03D 7/0244 416/1 |
| 2011/0142594 A1* | 6/2011 | Dinjus | F03D 7/0224 415/4.3 |
| 2011/0187107 A1* | 8/2011 | Toyohara | F03D 7/0244 290/44 |
| 2012/0063900 A1 | 3/2012 | Kestermann | |

FOREIGN PATENT DOCUMENTS

| | | |
|---|---|---|
| DE | 102012008547 A1 | 12/2012 |
| DE | 102013211989 A1 | 1/2015 |
| EP | 2058513 A2 | 5/2009 |
| EP | 2159416 A2 | 3/2010 |
| EP | 1650431 B1 | 9/2012 |
| KR | 101350511 B1 | 1/2014 |

\* cited by examiner

METHOD FOR CONTROLLING A ROTOR BLADE ADJUSTMENT DEVICE

CROSS-REFERENCE TO RELATED APPLICATIONS

This application is a 371 U.S. National Stage of International Application No. PCT/EP2016/065622, filed Jul. 1, 2016, and claims priority to German Patent Application No. 10 2015 110 715.5 filed Jul. 2, 2015, the disclosures of which are herein incorporated by reference in their entirety.

The invention relates to a method for controlling a rotor blade adjustment device of a wind turbine or water hydroelectric powerplant, the rotor blade adjustment device having a drive which is connected to a rotor blade which is subjected to a flow of wind or water and has the purpose of rotating the rotor blade about a rotor blade axis relative to a rotor hub on which the rotor blade is mounted so as to be rotatable about the rotor blade axis and an electromagnetic brake which is connected to the rotor blade and has the purpose of blocking rotation of the rotor blade about the rotor blade axis, the brake being actuated in order to change its activation state at a brake activation time and the drive being actuated to change its driving state at a drive activation time which has a predetermined chronological offset with respect to the brake activation time.

In wind turbines or water hydroelectric powerplants, rotor blade adjustment devices are used with converters to regulate the rotor blade position of rotor blades. The rotor blade adjustment devices can consist of a converter and an electric machine as a drive machine, such as e.g. a three-phase machine or a direct current machine or be configured in other conceivable electric forms. The electric machines used are equipped with an electromagnetic brake which mechanically brakes the drive of the respective machine in the currentless state such that the rotor blade driven by said machine is fixed in the respective position. A superordinate controller determines, inter alia, the desired position of the rotor blades based on current unit and usage conditions and specifies said position via a communication bus as the target value for the rotor blade adjustment devices of the different axes. In the converter of each rotor blade adjustment device, the actuation of the respective electric machine is regulated via a cascade regulator for position, rotational speed and current such that an electric current supplied to said machine generates the required drive torque. The electromagnetic brake of the respective electric machine is also actuated whereby its mechanical braking is suspended.

The actuation of the brakes and the actuation of the electric machines by the converters is synchronised such that on the one hand brakes and drives do not work against each other and on the other hand the rotor blades are not "torque free", i.e. without brake torque of the brakes or drive torque of the machines. A certain time lapses after the specification of the position by the superordinate controller to the build-up of the required drive torque which depends on different parameters, such as e.g. the current intermediate circuit voltage of the converter, the temperature of the drive machine etc. Each brake also requires certain time until the mechanical brake is suspended, this time also depending on different parameters, such as e.g. air gap of the brake, the wear of the brake pads, etc. The actuation of each brake with the required voltage is initiated via the respective converter, a correspondingly fixedly predetermined chronological offset between the start of the powering-up of the drive machine and the initiation of the brake actuation is taken into account via a regulating mechanism operating in the converter. A reversal of this operation takes place correspondingly when the rotor blade position has been reached.

A method for monitoring an electromagnetically activatable brake with a coil winding is known from DE 10 2012 008 547 A1, an anchor disc being attractable with a magnetic field generated by the coil winding such that the brake is ventilated. In doing so, the current of the coil winding is detected and the chronological current curve is evaluated such that distortion of the current caused when the brake is vented due to the positional change of the anchor disc of brake can be detected.

DE 10 2013 211 989 A1 describes a torque transfer device for a drive train of a motor vehicle, with a coupling unit and a control device for controlling the coupling unit and for monitoring a wear state of the coupling unit, the coupling unit comprising at least one frictional coupling for the controllable transfer of a torque from an input element to an output element and an electromagnetic actuator for activating the frictional coupling, the electromagnetic actuator comprising a coil and an anchor which is connected to a part of the frictional coupling and can be offset by exciting the coil and the control device being adapted to change an excitation of the coil and to evaluate the chronological curve of a change of a current flowing through the coil caused hereby in order to determine an inductance measurement value which represents a wear state of the coupling unit.

EP 1 650 431 B1 discloses a wind turbine with a device for aligning at least one movably arranged component of the wind turbine to influence the energy intake from the wind, with at least one actuator drive for setting an alignment of the component, which is activated via a control device, at least one brake device for holding a set alignment of the component and at least one sensor monitoring the brake device and coupled to the control device which is designed such that it detects a fault of the brake device and notifies a detected fault of the brake device to the control device, the control device being designed to check, based on predetermined parameters, whether the wind turbine must necessarily be switched off in the case of a notified fault and being designed to switch off the wind turbine.

EP 2 058 513 A2 describes a method of operating a wind turbine, the wind turbine comprising a rotor with a rotor axis and at least one rotor blade arranged on the rotor, the rotor blade being settable or being set at a predetermined rotor blade adjustment angle about a rotor blade axis and the at least one rotor blade being rotated into a rest position, after reaching a first predetermined rotational position of the rotor blade, the rotation of the rotor blade being braked and the stoppage position of the rotor blade reached as a result of the brake operation being detected.

DE 10 2006 049 490 A1 discloses an actuation switch for operating a direct current motor with electrically activatable holding brake, in particular for the adjustment of a rotor blade of a wind turbine or water hydroelectric powerplant which comprises an emergency power supply device and a three-bridge inverter, the emergency power supply device being releasably connected to the intermediate circuit of the three-bridge inverter via an emergency network switch element, the direct current motor being connected either to the three-bridge inverter or to the emergency power supply device via an emergency motor switch-over element and the holding brake being connected either to the three-bridge inverter or to the emergency power supply device via an emergency brake switch-over element.

The synchronisation of the drive power-up and the brake actuation takes place by means of preset offset times which are valid for defined parameters. These parameters can, however, be changed during operation, such as e.g. the temperature, the wear of the brake pad, the increase of the air gap between brake pad and anchor disc, etc. During the chronological offset, the drive is held at zero rotational speed by means of the regulating mechanism. As a result, based on the current requirements, the drives operate for, by and large, short times against the closed brakes in the case of offset times that are set too short and the actual positioning operations are unnecessarily delayed in the case of offset times that are set too long. If a safety margin sufficient for all operating conditions is selected for the offset time, the reaction time of the rotor blade positioning is impaired. If, in contrast, the offset time is too short, this means an unnecessary stress on the mechanics, unnecessary heating of the drive, the converter and/or the entire rotor blade adjustment device as well as unnecessary power requirement with reduced peak current times.

A worse reaction time of the rotor blade positioning with respect to an optimal reaction time means reduced energy utilisation of the wind turbine or water hydroelectric powerplant since the rotor blades cannot be aligned sufficiently fast to changing wind or water conditions. A reduced peak current time also leads to reduced times with peak drive torques which must be available in emergency situations whereby a certain oversizing of drive and converter is necessary to counteract this.

A secondary effect of the thermal loading is that all constructive elements of the rotor blade adjustment device are subject to a higher thermal stress. An additional secondary effect is that in the event the power supply fails, the back-up systems are heavily loaded by the energy release during the mentioned overlapping of the torques since the energy content released but not actually required must be supplied again.

The previous actuation of the brake gives no information on whether or not the brake disc has actually been released since it is only known whether or not the brake is supplied with energy. If the brake cannot open, e.g. due to a tilted anchor disc or anchor disc stuck due to oxidation, the output drive torque is perhaps not sufficient for moving the rotor blade in an emergency situation in sufficiently short time into the safer position in order to prevent a failure of the entire wind turbine or water hydroelectric powerplant.

It is therefore desired to provide a solution to optimise the synchronisation of actuation of the electromagnetic brake and powering-up of the drive machine. It is in particular desired to reduce the reaction time of the rotor blade positioning. It is also desired to reach an energy-efficient usage of the drive machine and thus a reduced thermal loading of the drive machine, the converter and thus the entire rotor blade adjustment device. It is also desired to unload and load the back-up systems only with the energy actually required. It is also desired to be able to obtain a message regarding the actual switch state of the brake in relation to the brake disc in order to detect e.g. failed brakes and/or wear of the brake disc without having to use an external sensor in or on the brake.

Based on this, the object underlying the invention is to be able to match the drive activation time and the brake activation time in an improved manner in a method of the type mentioned in the introduction.

This object is achieved according to the invention with a method according to Claim 1. Preferred further developments of the invention are indicated in the dependent claims and in the following description.

The method mentioned in the introduction to control a rotor blade adjustment device of a wind turbine or water hydroelectric powerplant, the rotor blade adjustment comprising a drive which is connected to a rotor blade which is subjected to a flow of wind or water and has the purpose of rotating the rotor blade about a rotor blade axis relative to a rotor hub on which the rotor blade is mounted so as to be rotatable about the rotor blade axis and an electromagnetic brake which is connected to the rotor blade and has the purpose of blocking rotation of the rotor blade about the rotor blade axis, the brake being actuated in order to change its activation state at a brake activation time, and the drive being actuated to change its driving state at a drive activation time which has a predetermined chronological offset at the brake activation time, is further developed according to the invention in that an electric current flowing through the brake and/or supplying said brake is measured, the shape of the current-time curve resulting therefrom is evaluated and the chronological offset is newly determined and/or adapted depending on the result of this evaluation.

By evaluating the shape of the current-time curve, the actual condition of the brake can be discerned. If this has changed, e.g. due to wear, the chronological offset will be adapted to the current condition of the brake by newly determining and/or adapting it. The drive activation time and the brake activation time can thus be matched well to each other. The chronological offset is preferably changed after evaluating the shape of the current-time curve, in particular if the newly determined and/or adapted chronological offset deviates from the previous, current or hitherto valid chronological offset.

In the currentless state of the brake, the brake preferably blocks a rotation of the rotor blade about the rotor blade axis. The brake can be advantageously released by powering-up and/or the brake is advantageously releasable by powering-up. Powering-up the brake is in particular understood as supplying the or an electric current to the brake.

The brake is in particular controlled and/or actuated by a control device. The brake is preferably actuated for the purpose of changing its activation state at the brake activation time by the control device. The rotor blade adjustment device preferably comprises the control device.

The drive is in particular controlled and/or actuated by a drive control device. The drive is preferably actuated for the purpose of changing its driving state at the drive activation time by the drive control device. The rotor blade adjustment device preferably comprises the drive control device. The drive control device preferably communicates with the control device and/or the drive control device is preferably in communication connection with the control device. For example, the control device is formed by the drive control device or the drive control device is e.g. formed by the control device.

The current-time curve is preferably a measured curve. The current-time curve is in particular saved. The current-time curve is preferably in the form of measured values which are or will be preferably saved. For example, the current-time curve is or will be saved and/or the measured values are or will be saved in the control device and/or the drive control device. The evaluation of the shape of the current-time curve is carried out in particular by means of the control device and/or the drive control device. For example, the evaluation of the current-time curve or the shape of the current-time curve is carried out in real time.

The electric current flowing through the brake and/or supplied to it is in particular measured continuously and/or over or at least over one time interval. The electric current flowing through the brake and/or supplied to it is in particular measured when the activation state of the brake is changed. The time interval preferably begins at the brake activation time and/or the brake activation time is at the beginning and/or within the time interval. The time interval preferably ends at the time the activation state of the brake changes and/or the time the activation state of the brake is at the end and/or within the time interval. The time the activation state of the brake changes is in particular after the brake activation time. The time interval and/or the duration of the time interval is preferably predetermined. Alternatively, the time interval ends when the measured current reaches, exceeds or falls short of a predetermined limit value. A continuous or permanent evaluation of the current-time curve or the shape of the current-time curve is also possible, in particular with a modulated alternating current signal.

The drive is often more rapidly responsive than the brake. The drive activation time is preferably after the brake activation time in particular by the chronological offset value. Alternatively, the drive activation time can, however, also be before the brake activation time, in particular by the chronological offset value. If the chronological offset is a signed variable, then the aforementioned alternative can, however, also be taken into account by a negative chronological offset or vice versa. The chronological offset may also be zero in a limiting case such that the drive activation time coincides with the brake activation time. The chronological offset is preferably greater than or equal to zero.

The drive is in particular an electric drive. Two or at least two driving states are preferably assigned to the drive. In a first driving state, the drive is in particular currentless and/or the drive in particular does not generate a torque to rotate the rotor blade about the rotor blade axis or to hold the rotor blade at rest in its position in relation to the rotor blade axis and/or the drive. In a second driving state, the drive is in particular powered-up and/or the drive in particular generates a torque to rotate the rotor blade about the rotor blade axis or to hold the rotor blade in its position in relation to the rotor blade axis and/or the drive rotates the rotor blade about the rotor blade axis or holds the rotor blade in its position in relation to the rotor blade axis. A change to the driving state of the drive is in particular a change between the first driving state and the second driving state and/or from one of the driving states to another driving state. In particular, a change of the driving state of the drive is a change from the first driving state to the second driving state or from the second driving state to the first driving state. In the case of a change from the first driving state to the second driving state, the generation of the or a torque to rotate the rotor blade about the rotor blade axis or to hold the rotor blade in its position in relation to the rotor blade axis and/or rotating the rotor blade about the rotor blade axis or holding the rotor blade in its position in relation to the rotor blade axis is preferably initiated by means of the drive. In the case of a change from the second driving state to the first driving state, the generation of the or a torque to rotate the rotor blade about the rotor blade axis or to hold the rotor blade in its position in relation to the rotor blade axis and/or rotating the rotor blade about the rotor blade axis or holding the rotor blade in its position in relation to the rotor blade axis is preferably ended by means of the drive.

Two or at least two activation states are preferably assigned to the brake. In a first activation state, the brake is in particular currentless or powered-up and/or engaged and/or the brake in particular blocks the rotor blade and/or the brake in particular blocks the or a rotation of the rotor blade about the rotor blade axis. In a second activation state, the brake is in particular powered-up or currentless and/or released and/or the rotor blade released and/or the or a rotation of the rotor blade about the rotor blade axis is in particular released and/or possible. If the brake is currentless in the first activation state, then it is preferably powered-up in the second activation state. If the brake is powered-up in the first activation state, then it is preferably currentless in the second activation state. A change of the activation state of the brake is in particular a change between the first activation state and the second activation state and/or from one of the activation states to another activation state. In particular, a change of the activation state of the brake is a change from the first activation state to the second activation state or from the second activation state to the first activation state. In the case of a change from the first activation state to the second activation state, the brake preferably is released and/or disengaged and/or the rotor blade is released and/or the or a rotation of the rotor blade about the rotor blade axis is released and/or enabled. In the case of a change from the second activation state to the first activation state, the brake is in particular engaged and/or the rotor blade is in particular braked by the brake and/or blocked and/or the or a rotation of the rotor blade about the rotor blade axis is in particular braked and/or blocked by the brake.

According to a first preferred variant, the drive is actuated at the drive activation time to rotate the rotor blade about the rotor blade axis onto hold the rotor blade in its position in relation to the rotor blade axis and/or to generate the or a torque to rotate the rotor blade about the rotor blade axis or to hold the rotor blade in its position in relation to the rotor blade axis and/or at a change from the first driving state to the second driving state and/or to adopt the second driving state. To this end, the drive is in particular switched on and/or supplied with electric current (powered-up). The brake is also preferably actuated at the brake activation time to release the brake and/or to release the rotor blade and/or to release the or a rotation of the rotor blade about the rotor blade axis and/or at a change from the first activation state to the second activation state and/or to adopt the second activation state. In addition, the brake is in particular switched on and/or supplied with current (powered-up) or switched off and/or switched in a currentless manner. The brake advantageously blocks the rotor blade at the brake activation time and/or the or a rotation of the rotor blade about the rotor blade axis. The brake is in particular located in the first activation state at the brake activation time. The drive is preferably at rest at the drive activation time and/or the drive preferably does not generate a torque to rotate the rotor blade about the rotor blade axis or to hold the rotor blade in its position in relation to the rotor blade axis. The drive is in particular located in the first driving state at the drive activation time.

According to a second preferred variant, the drive is actuated at the drive activation time to rest and/or to end the or a, in particular driven rotation of the rotor blade about the rotor blade axis or the or a, in particular active holding of the rotor blade in its position in relation to the rotor blade axis and/or to end the or a generation of the or a torque to rotate the rotor blade about the rotor blade axis or to hold the rotor blade in its position in relation to the rotor blade axis and/or at a change from the second driving state to the first driving state and/or to adopt the first driving state. In addition, the drive is in particular switched off and/or switched in a currentless manner. The brake is preferably actuated to block the rotor blade and/or to block the or a rotation of the rotor blade about the rotor blade axis and/or at a change from the second activation state to the first activation state and/or to adopt the first activation state. In addition, the brake is in particular switched off and/or switched in a currentless manner or switched on and/or supplied with current (powered-up). At the brake activation time, the brake is advantageous released and/or the rotor blade is preferably released and/or the or a rotation of the rotor blade about the rotor blade axis is preferably released and/or possible. The brake is in particular located at the brake activation time in the second activation state. At the drive activation time, the drive advantageously rotates the rotor blade about the rotor blade axis or holds the rotor blade in its position in relation to the rotor blade axis and/or the drive advantageously generates the or a torque to rotate the rotor blade about the rotor blade axis or to hold the rotor blade in its position in relation to the rotor blade axis. The drive is in particular located in the second driving state at the drive activation time.

The first and the second variants are preferably alternatives. However, it is also possible to perform the first variant and the second variant after each other. The second variant is advantageously performed after the first variant. Additionally or alternatively, the first variant is performed e.g. after the second variant.

The electric current flowing through the brake is for example a direct current. According to a further development, the electric current flowing through the brake has an activation current portion and an alternating current portion overlapping the latter, the shape of the current-time curve in particular being evaluated by evaluating the activation current portion or by evaluating the overlapping alternating current portion or by evaluating the activation current portion and the overlapping alternating current portion. The activation current portion is preferably a direct current or direct current portion. The or an inductance of the brake or the or a or at least one electromagnet of the brake is in particular determined from the alternating current portion.

An electric voltage source is preferably provided by means of which an electric voltage is or can be applied to the brake. The electric voltage source in particular delivers the electric current flowing through the brake or can deliver said current. The electric voltage and/or a change of the electric voltage preferably produces the electric current flowing through the brake.

The electric voltage provided by the electric voltage source is in particular a direct voltage. For example, the electric voltage provided by the electric voltage source is a constant direct voltage. Alternatively, the electric voltage provided by the electric voltage source is a pulsed or pulse-modulated direct voltage. In this case, the chronological distance between two consecutive pulses of the electric voltage is in particular smaller than the mechanical reaction time of the brake and/or of one or a plurality of movable parts of the brake, such as e.g. an anchor disc. According to a further development, the electric voltage provided by the electric voltage source has an activation voltage portion and an alternating voltage portion overlapping the latter. The activation voltage portion is preferably a constant direct voltage or a constant direct voltage portion. The activation voltage portion is preferably non-zero. The alternating voltage portion in particular produces the alternating current portion. The activation voltage portion and/or a change of the activation voltage portion in particular produces the activation current portion.

According to one configuration, the brake is connected at the brake activation time, preferably by means of the control device to the or an electric voltage source and/or the electric voltage or the activation voltage portion, is set preferably by means of the control device to a non-zero value, in particular greater than zero. This takes place in particular with the first variant or alternatively with the second variant. The voltage source in this case preferably delivers the electric current flowing through the brake. Alternatively, the brake is separated preferably by means of the control device at the brake activation time from the or an electric voltage source and/or the electric voltage or the activation voltage portion is set to a lower value or to a value of zero preferably by means of the control device which in particular takes place in the second variant or alternatively in the first variant.

In the second or alternatively in the first activation state of the brake, the voltage source is or will be connected, preferably by means of the control device, in particular to the brake and/or the or an electric voltage is or will be applied, preferably by means of the control device, in particular to the brake. In the first or alternatively in the second activation state of the brake, the voltage source is or will be separated, preferably by means of the control device, in particular from the brake and/or the or an electric voltage applied to the brake is or will be set preferably by means of the control device, in particular lower than at the first activation time and/or is or will be set to a value of zero.

The electromagnetic brake is preferably a spring-loaded brake. According to one configuration, the brake has a support, one or at least one brake disc, one or at least one anchor disc mounted on the support so as to be displaceable relative to the brake disc, one or at least one or a plurality of springs mounted on the support and pressing the anchor disc in the direction of the brake disc or a stop which press the anchor disc in the currentless state of the brake, in particular against the brake disc or the stop and one or at least one electromagnet through which in particular the electric current flows or can flow, the electromagnet, in the powered-up state, moving the anchor disc away from the brake disc or stop by way of the magnetic force against the force of the spring or springs or holds said anchor disc at a distance to the brake disc. The stop is e.g. provided at a distance to the brake disc. For example, the stop is provided on the support. However, the stop is preferably formed by the brake disc.

The brake disc preferably supports one or at least one brake pad or a plurality of brake pads. The brake disc is advantageously mounted on the support, in particular so as to be rotatable. The brake disc is preferably connected in a torsionally-rigid manner to the rotor hub or to the rotor blade. The support is also preferably connected in a torsionally-rigid manner to the rotor blade or to the rotor hub. The anchor disc is advantageously mounted on the support so as to be rotatable or connected in a torsionally-rigid manner to said support. The anchor disc preferably consists of magnetic material and/or of a magnetisable material and/or the anchor disc has one or a plurality of regions made of magnetic material and/or made of a magnetisable material. When the electromagnet is in the powered-up state, this means that the or an electric current is supplied to the electromagnet. The electromagnet preferably has one or at least one electric coil. The coil is preferably attached to the support and/or rigidly connected to the support. The support is in particular also designated as a coil support. The electromagnet is preferably fixedly, in particular rigidly connected to the support and/or the support, together with the coil, forms the electromagnet. For example, the support forms a coil core of the coil. The support preferably consists, in particular completely or at least partially, of magnetic material and/or of a magnetisable material. In the powered-up state of the electromagnet, the anchor disc abuts on the coil and/or on the support and/or on a stop or the anchor disc is applied to the coil and/or the support and/or the stop. The stop is e.g. formed by the support or by the coil and/or is preferably rigidly connected to the support or the coil. For example, the stop is provided on the support or on the coil. The brake disc is in particular arranged at a distance from the coil and/or from the support and/or from the stop. In the powered-up state of the electromagnet, the anchor disc is preferably moved away from the brake disc by way of the magnetic force against the force of the spring or springs until the anchor disc abuts on the coil and/or on the support and/or on the stop or is held at a distance to the brake disc, in particular abutting on the coil and/or on the support and/or on the stop.

In the first activation state of the brake which in particular corresponds to the currentless state of the brake, the anchor disc preferably abuts on the brake disc and/or the anchor disc is preferably pressed by means of the spring or springs against the brake disc. In the second activation state of the brake which in particular corresponds to the powered-up state of the brake, the anchor disc is preferably moved away from the brake disc and/or the anchor disc is preferably held at a distance from the brake disc and/or the anchor disc preferably abuts on the coil and/or on the support and/or on the stop.

The drive preferably has a drive housing and a drive shaft rotatable relative to said drive housing. The drive housing is in particular connected in a torsionally-rigid manner to the rotor hub or to the rotor blade. The drive shaft is also connected to the rotor blade or to the rotor hub preferably in a torsionally-rigid manner. For example, the brake disc is connected to the drive shaft or to the drive housing in a torsionally-rigid manner. The support is for example also connected to the drive housing or to the drive shaft in a torsionally-rigid manner. The anchor disc is advantageously connected to the drive housing or to the drive shaft in a torsionally-rigid manner. In the powered-up state of the brake, the brake disc is or will be pressed by means of the spring or springs and/or the anchor disc for example against the rotor hub, against the rotor blade, against the drive housing, against the drive shaft or against the support. For example, the brake disc is or will be clamped in the currentless state of the brake between the anchor disc and the rotor hub, the rotor blade, the drive housing, the drive shaft or the support.

According to one further development, an activation time of the brake is determined by evaluating the shape of the current-time curve. This activation time is in particular the or a current activation time of the brake. The predetermined chronological offset is preferably newly determined and/or adapted, in particular changed depending on the activation time. The predetermined chronological offset is preferably changed depending on the activation time, in particular if the newly determined and/or adapted chronological offset deviates from the previous, current or hitherto valid chronological offset. The activation time is preferably the time which lapses from the brake activation time to the change of the activation state of the brake. According to the first variant, the activation time is in particular the time which lapses from the brake activation time to the adoption of the second activation state of the brake. For example, in the first variant, the activation time is the time which lapses proceeding from a state of the brake blocking the rotor blade and/or the or a rotation of the rotor blade about the rotor blade axis and/or from the first activation state of the brake to the release of the brake and/or to the moving of the anchor disc away from the brake and/or to the adoption of the second activation state of the brake. According to the second variant, the activation time is in particular the time which lapses from the brake activation time to the adoption of the first activation state of the brake. For example, in the second variant, the activation time is the time which lapses proceeding from the released state and/or from the second activation state of the brake until the state of the brake blocking the rotor blade and/or the or a rotation of the rotor blade about the rotor blade axis and/or until the anchor disc is applied to the brake disc and/or until the first activation state is adopted.

According to one configuration, the electric current and/or activation current portion is changed up to a first time located after the brake activation time at which the magnetic force preferably corresponds or approximately corresponds in particular to the force of the spring or springs. The electric current and/or the activation current portion is preferably changed up to a second time located after the first time more slowly than between the brake activation time and the first time. The electric current and/or activation current portion is advantageously changed after the second time more strongly than between the first and second time.

According to a first alternative, the electric current and/or activation current portion increases e.g. up to a first time located after the brake activation time at which the magnetic force preferably corresponds or approximately corresponds in particular the force of the spring or springs. The electric current and/or activation current portion preferably increases up to a second time located after the first time more slowly than between the brake activation time and the first time. The electric current and/or activation current portion advantageously increases after the second time more strongly than between the first and second time. The first alternative in particular applies for the first variant or alternatively for the second variant.

According to a second alternative, the electric current and/or activation current portion decreases e.g. up to a first time located after the brake activation time, at which the magnetic force preferably corresponds or approximately corresponds in particular to the force of the spring or springs. The electric current and/or the activation current portion preferably decreases up to a second time located after the first time more slowly than between the brake activation time and the first time. The electric current and/or the activation current portion advantageously decrease more strongly after the second time than between the first and the second time. The second alternative in particular applies for the second variant or alternatively for the first variant.

The chronological offset is in particular adapted and/or newly determined depending on the difference between the second time and the brake activation time. The difference between the second time and the brake activation time preferably is or produces the or an activation time of the brake. The evaluation of the shape of the current-time curve thus includes recognising regions of different increase and/or change speed of the current-time curve, from which in particular the second time results.

The rotor blade adjustment device and/or the drive preferably has one or at least one electromotor which, is preferably connected to the rotor blade with the interconnection of a gear mechanism. The electromotor is e.g. a three-phase motor, for example an asynchronous machine or a synchronous machine. Alternatively, the electromotor is e.g. a direction current machine, for example a series motor, a shunt motor, a permanent magnet-aroused direct current machine or a compound motor. The rotor blade adjustment device and/or the drive also preferably has one or at least one converter by means of which the electromotor is or can be electrically fed and/or controlled. The converter is preferably connected to a control unit. The converter in particular comprises the or a control unit. The converter is preferably controlled by means of the control unit and/or is controllable by means of the control unit. An AC input voltage is preferably supplied to the converter. In the converter, the AC input voltage in particular leads to an AC output voltage. However, the converter is also preferably operable such that the AC input voltage leads to a DC output voltage which is or can be for example a constant or a pulsed DC output voltage. The control unit preferably is or forms or comprises the control device and/or the drive control device.

The converter preferably has a rectifying input stage, an output stage and an intermediate circuit connected between the input stage and the output stage which is in particular a direct current or direct voltage intermediate circuit. The intermediate circuit advantageously has an electrical capacitor. The output stage is preferably controlled by means of the control unit and/or is controllable by the same. Additionally, the input stage is also for example controlled by means of the control unit and/or is controllable by the same. The output stage is e.g. an inverter, a DC chopper or a pulse-width modulator and/or the output stage operates e.g. as an inverter, as a DC chopper or as a pulse-width modulator. In particular the output stage is a transistor output stage.

The electromotor preferably has a motor housing and a motor shaft rotatable relative to said motor housing. The motor housing in particular forms the drive housing. The motor shaft preferably forms the drive shaft.

The rotor hub is preferably rotatable about a rotor axis. The rotor hub is advantageously mounted so as to be rotatable about the or a rotor axis, in particular on a support element. The support element is e.g. a mainframe. The rotor blade axis preferably extends transverse or approximately transverse to the rotor axis away from the rotor hub. The rotor hub and the rotor blade are in particular part of a rotor which is or can be rotated about the rotor axis by the wind or water current acting on the rotor blade. The rotor preferably has at least one additional rotor blade, the rotor blades being arranged in particular evenly distributed about the rotor axis. The rotor and/or the rotor hub is preferably mechanically coupled to an electric generator. The rotor and/or the rotor hub drives the or an electric generator to generate electric energy.

The brake is preferably supplied with electric voltage and/or electric current via or by the control device or control unit. The control device or control unit forms or comprises for example the electric voltage source. The control device or control unit is advantageously supplied with electric energy by an electric energy supply device. The electric energy supply is or comprises e.g. an electric power supply grid and/or an emergency supply device and/or one or at least one electric energy storage system. The electric current flowing through the brake and/or through the electromagnet is preferably measured, in particular by means of the control device or control unit. The shape of the current-time curve is advantageously evaluated, preferably when the brake is switched on and/or off, in particular by means of the control device or control unit. Information regarding the actuation state of the brake is in particular obtained from the strength and/or the progress of the measured current and/or by the or an evaluation of the measured current and/or the shape of the current-time curve such that e.g. statements can be made as to whether a current does not flow through the brake and/or whether a short-circuit is present in the brake and/or whether a defect is present in the actuation of the brake and/or in the control device.

The control device or control unit preferably comprises a digital computer. The control device or control unit in particular comprises a program (software) to evaluate the shape of the current-time curve. The software preferably runs in the control device or control unit and/or the digital computer. The shape of the current-time curve is in particular evaluated by means of the software. The control device or control unit preferably comprises a memory. The measured current-time curve is in particular stored in the form of measured values in the memory. Additionally or alternatively, a real-time evaluation of the current-time curve or the shape of the current-time curve is possible.

A superordinate controller of the wind turbine or water hydroelectric powerplant preferably controls the control device and/or the control unit and/or the drive control device. The superordinate controller of the wind or water hydroelectric powerplant is or forms or comprises for example the control unit and/or the control device and/or the drive control device.

Information regarding the opening condition of the brake and/or the anchor disc of the brake is preferably obtained and/or generated by the evaluation, in particular software evaluation of the shape of the current-time curve. An adaptation of the chronological offset between the brake activation time and the drive activation time is thus enabled. Permanently defined offset times and long reaction times resulting therefrom and/or overlapping drive and brake torques which are associated in particular with the mentioned negative effects, can be thereby avoided.

Information regarding the status of the brake is preferably also obtained and/or generated by the evaluation, in particular software evaluation of the shape of the current-time curve and in particular supplied to a monitoring device or the superordinate controller of the wind turbine or water hydroelectric powerplant. The monitoring device or superordinate controller of the wind or water hydroelectric powerplant can thus react to the status of the brake. The information regarding the status of the brake comprises e.g. information on whether the brake is down, blocked, opened or not opened. Based on this information, emergency situations can be avoided and preventative and plannable service work can take place which prevent a stoppage of the wind turbine or water hydroelectric powerplant or even possible damage to the same.

Information is preferably also obtained and/or generated by the evaluation, in particular software evaluation of the shape of the current-time curve which enables statements to be made regarding a changing air gap of the brake and/or the wear of a brake pad of the brake. Based on this information, preventative and plannable service works can take place which prevent a stoppage of the wind turbine or water hydroelectric powerplant or even possible damage to the same. The air gap of the brake is in particular an air gap or gap between the anchor disc and the brake disc.

Generally, the rotor blade adjustment device (pitch drive) is located during the majority of its active operating time alternating between stoppage and positioning operation in which the rotor blade is rotated. The reduction of the reaction time enabled or achieved by the invention thus enables in particular improved dynamic transitions and as a result an increase of the energy utilisation in the case of changing wind or water conditions.

The thermal loading of the converter and/or the electromotor can in particular also be reduced in the transitions between stoppage and positioning operation whereby an improved service life and possibly even greater functional safety of the rotor blade adjustment device is achieved.

The intake of required electric energy can in particular also be reduced to an actually required output power of the drive since required energy consumption can be prevented by brake and drive possibly working against each other. The electric energy intake can in particular be adapted such that in the event the grid is missing, e.g. a longer service life of the or an emergency power supply device (backup buffer system) connected or connectable to the rotor blade adjustment device can be achieved which in particular comprises electrical energy storage systems, such as e.g. accumulators and/or electrical capacitors. The service life of the emergency power supply device can also for example be increased by the invention in the transitions in the event the grid is missing owing to reduced peak loading. In the event of a failure of the grid and the emergency power supply device, the brake is in particular blocked and preferably monitored during the process.

The invention in particular allows for preventative and plannable service works to take place which counteract a stoppage or even possible damage to the wind turbine or water hydroelectric powerplant.

The or a superordinate controller of the wind turbine or water hydroelectric powerplant in particular receives information by way of the invention as to whether or not the brake of the rotor blade adjustment device is actually open whereby improved statements are possible regarding the state of the wind turbine or water hydroelectric powerplant and emergency situations can thus be avoided or prevented.

The actuation of the brake preferably takes place with electric energy via or by the control device which, e.g. forms a part of the converter in an advantageous configuration. The electric current flowing through the brake and/or supplied to the same is in particular measured by and/or in the control device. The measuring of the electric current flowing through the brake and/or supplied to the same and/or the recording of the measurement values preferably takes place by means of a current sensor which is in particular connected to the control device. The current sensor is preferably a Hall current sensor. The shape of the current-time curve can thus be sufficiently accurately and rapidly detected. The electric energy supply of the brake preferably takes place with a direct voltage. The electric voltage is for example 24 V.

In an additional configuration, overlapping of the direct voltage and/or the activation voltage portion is possible with an alternating voltage portion such that the evaluation, in particular the software evaluation of the shape of the recorded current-time curve also or even alternatively produces the desired information. The alternating voltage portion can in this case also be implemented by chronologically short switch-off cycles which are preferably short such that a mechanical reaction cannot take place due to the inertia of the brake.

The or a software to evaluate the shape of the current-time curve runs e.g. in the control unit of the converter which also controls the brake in an advantageous configuration which defines the current powering-up of the electromotor or its motor coil and/or monitors the temperature of the electromotor and thus has a variety of information and/or in particular all necessary information regarding the state of the drive and for the actuation of the brake.

The shape of the current-time curve will preferably be evaluated by means of the software of the control unit, possibly also taking into account additional information, e.g. regarding the switch-on and switch-off time and/or the current motor temperature. The information obtained is preferably permanently compared with the existing results whereby an adaptation of the chronological offset between the actuation of the brake and the powering-up of the drive is enabled, in particular in a sliding manner and statements or information on the switching state of the brake and the wear of the brake pad can preferably also be implemented. Information on the switching state of the brake includes e.g. information on whether the brake is down, blocked, opened or not opened.

Figure 2:
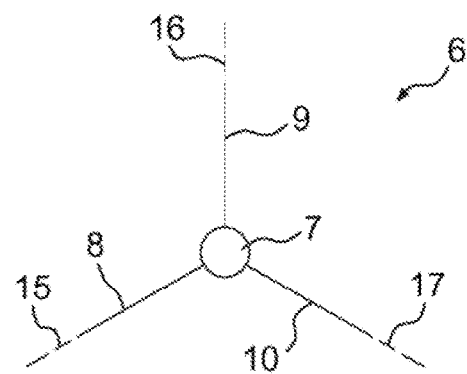
Figure 3:
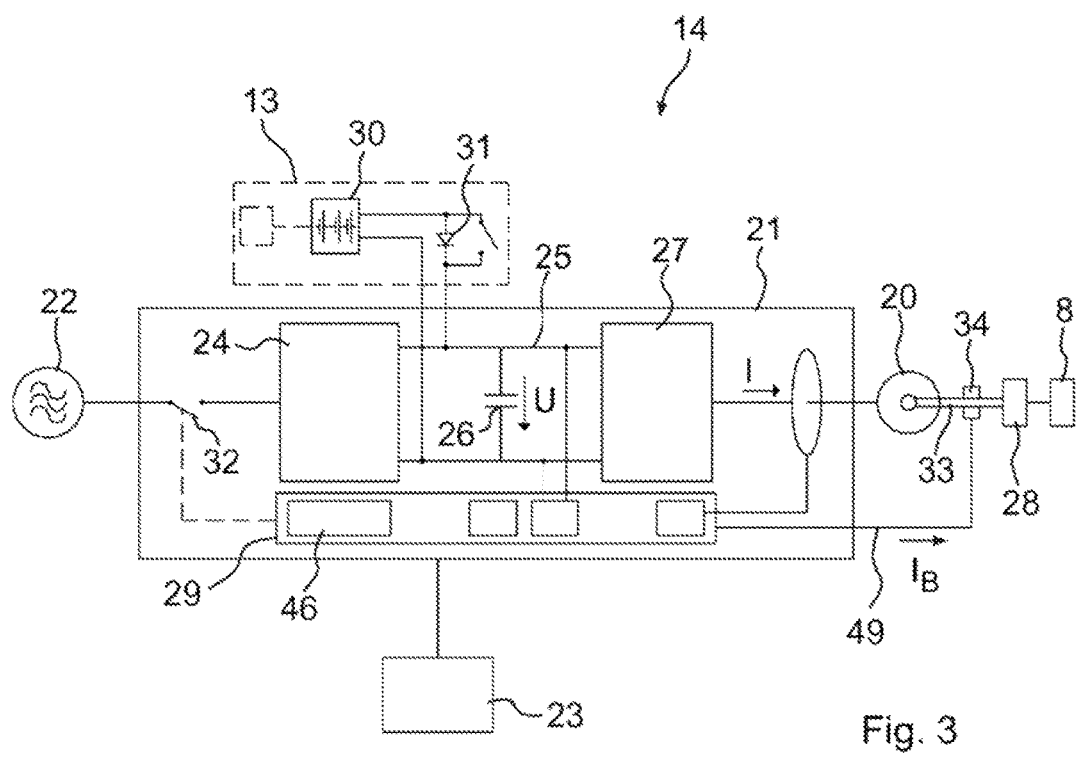
Figure 4:
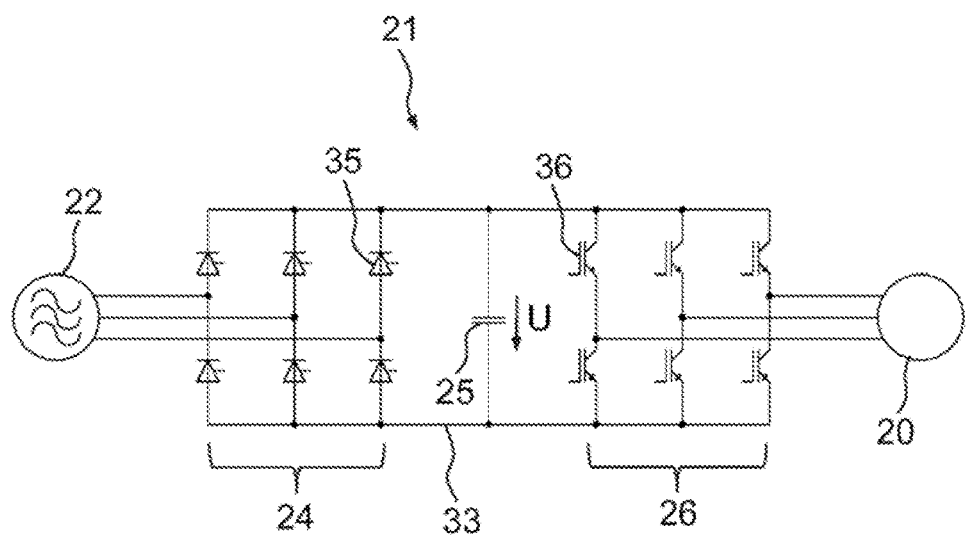
Figure 5:
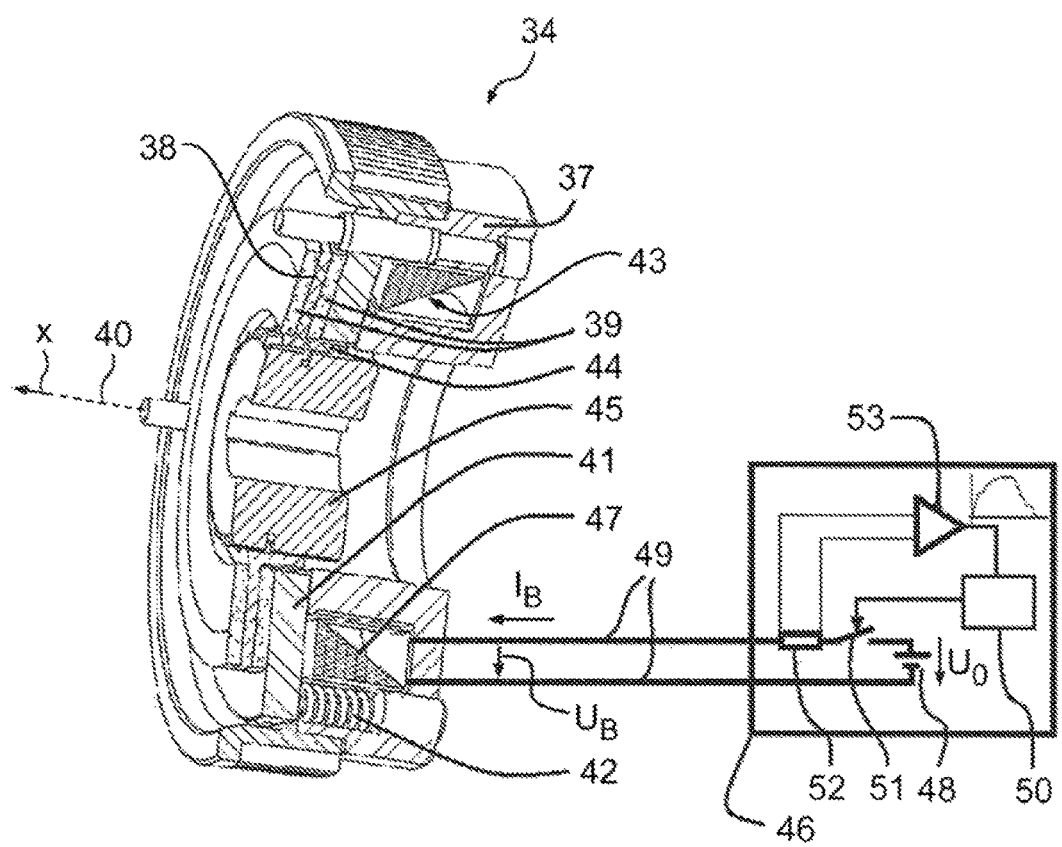
Figure 6:
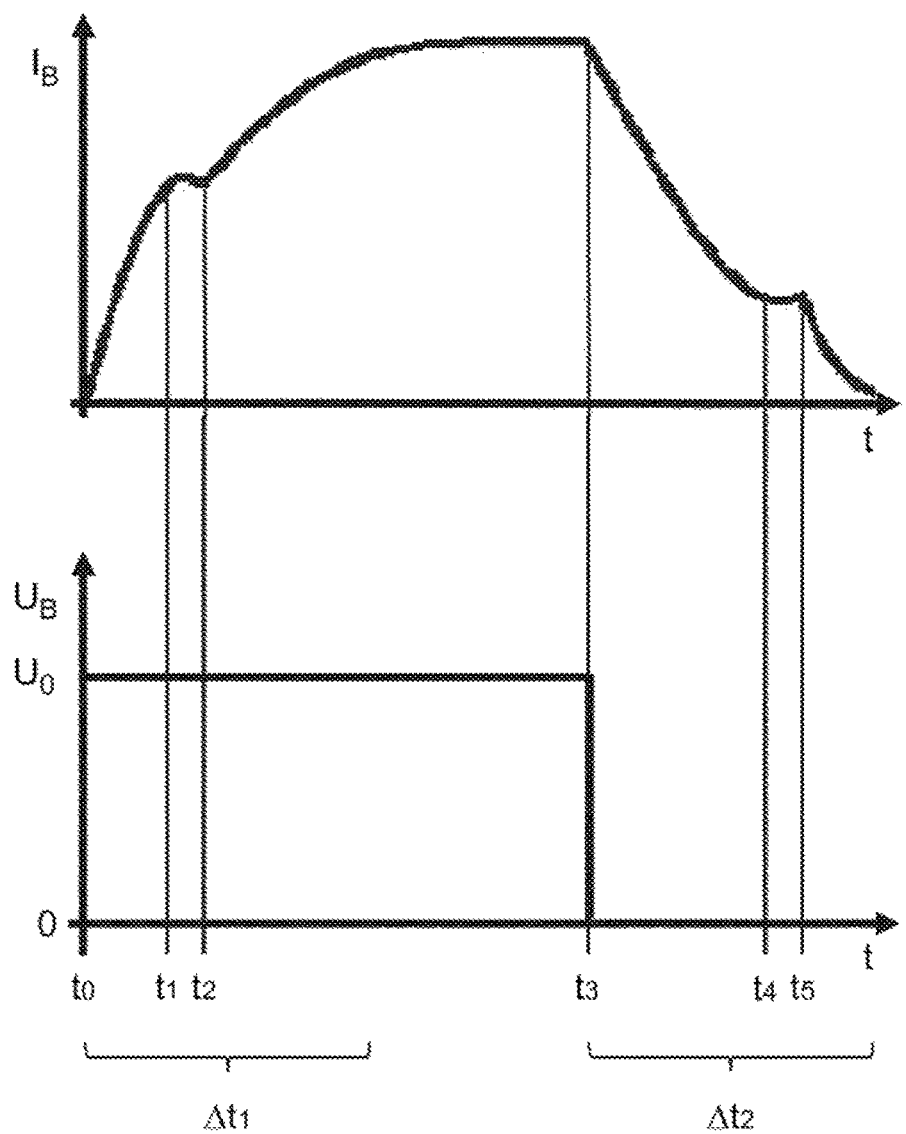
Figure 7:
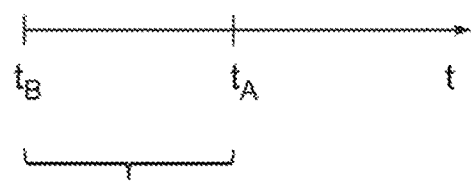

The invention is described below based on a preferred embodiment with reference to the drawing. In the drawing is shown:

FIG. 1 a schematic representation of a wind turbine,

FIG. 2 a schematic plan view on a rotor of the wind turbine,

FIG. 3 a schematic block diagram of a rotor blade adjustment device of the wind turbine, FIG. 4 a schematic circuit diagram of a converter of the rotor blade adjustment device, FIG. 5 a perspective and partially cut view of an electromagnetic brake of the rotor blade adjustment device, FIG. 6 a current-time diagram of an electric current flowing through the brake and a voltage-time diagram of an electric voltage applied to the brake and FIG. 7 a timeline which illustrates a chronological offset between the actuation of the brake and an electromotor of the rotor blade adjustment device.

A schematic representation of a wind turbine 1 is discernible from FIG. 1 which includes a tower 3 standing on a foundation 2 on whose end facing away from the foundation 2 a nacelle 4 is arranged. The nacelle 4 comprises a mainframe 5 on which a rotor 6 is rotatably mounted which comprises a rotor hub 7 and a plurality of rotor blades 8, 9 and 10 connected to said rotor hub (see also FIG. 2). The rotor 6 is mechanically coupled to an electric generator 11 which is arranged in the nacelle 4 and is attached to the mainframe 5.

A rotor blade adjustment system (pitch system) 12 is arranged in the rotor 6 which comprises rotor blade adjustment devices (pitch drives) 14 including emergency power supply devices 13 by means of which the rotor blades 8, 9 and 10 can be rotated about their respective longitudinal axis (rotor blade axis) 15, 16 or 17 relative to the rotor hub 7 (see also FIG. 2). In this case, one of the rotor blade adjustment devices 14 is assigned to each of the rotor blades. The rotor 6 can be rotated by the force of the wind 18 about a rotor axis 19.

FIG. 2 shows a schematic plan view on the rotor 6 such that the three rotor blades 8, 9 and 10 are discernible. Alternatively, only two or more than three rotor blades can also be provided.

A schematic block diagram of one of the rotor blade adjustment devices 14 with associated emergency power supply device 13 is represented in FIG. 3, an electromotor 20 being electrically coupled to a converter 21 which is connected to an electrical supply grid (primary power supply) 22 and is fed from said supply grid. The converter 21 is also connected to a controller 23 by means of which the rotor blade adjustment device 14 is controlled. The controller 23 is e.g. a superordinate controller of the wind turbine 1. The converter 21 comprises a rectifier 24, an intermediate circuit 25 with a capacitor 26 and an output stage 27. The electromotor 20 is mechanically coupled to the rotor blade 8 with interconnection of a gear mechanism 28 which, by means of the electromotor 20, is rotatable about the rotor blade axis 15. The converter 21 also comprises a control unit 29 by means of which the converter 21 is controllable.

The emergency power supply device 13 comprises an energy capacitor 30 which is connected via a diode 31 on the intermediate circuit 25. The primary power supply 22 is connected to the input of the inverter 24 with interconnection of a switch 32 which can be activated by means of the control unit 29. A brake 34 is provided on the motor shaft 33 of the motor 20 by means of which a rotation of the motor shaft 33 can be released or blocked such that a rotation of the rotor blade 8 about the rotor blade axis 15 can also be released and blocked by means of the brake 34. The brake 34 is controlled by means of the control unit 29. If the rotor blade 8 is rotated about its rotor blade axis 15, the brake 34 is thus released. If the rotor blade 8 is not rotated, a rotation of the rotor blade 8 about the rotor blade axis 15 is thus blocked by means of the brake 34.

A schematic circuit diagram of the converter 21 is discernible from FIG. 4, the inverter 24 comprising six thyristors 35 and is thus designed as an activatable inverter. The gate connections of the thyristors 35 are actuated by means of the control unit 29 such that it is possible to activate and deactivate the inverter 24 by means of said control unit. The output stage 27 is designed as a transistor output stage and comprises six transistors 36 whose gate or base connections are actuated by means of the control unit 29. The motor current I supplied to the motor 20 is thus controllable by means of the output stage 27 and the control unit 29. The transistors 36 are designed here as bipolar transistors with insulated gate bipolar electrode (IGBT).

A perspective and partially cut view of the brake 34 is discernible in FIG. 5 which comprises a support (coil support) 37, a brake disc 38 mounted on the support 37 with brake pads 39, an anchor disc 41 mounted on the support 37 so as to be displaceable relative to the brake disc 38 along an axis 40, a plurality of pressure springs 42 mounted on the support 37 which press the anchor disc 41 in the currentless state of the brake 34 in a direction x running along the axis 40 against the brake disc 38 and an electromagnet 43 through which an electric current $I_B$ can flow, the electromagnet 43 in the powered-up state moving the anchor disc 41 away from the brake disc 38 by way of magnetic force against the force of the springs 42 or holding the anchor disc at a distance to the brake disc.

The brake disc 38 is attached to a rotor element 44 which is connected in a torsionally-rigid manner to the motor shaft 33 via a toothed hub 45 which can change the position of the rotor blade 8 via the gear mechanism 28. The rotor element 44 is preferably sleeve shaped. The rotor element 44 is in particular rigidly or torsionally-rigidly connected to the brake disc 38. The electromagnet 43 comprises an electric coil 47 fixedly connected to the support 37. The pressure springs 42 arranged distributed on the circumference of the support 37 designed rotationally-symmetrically or substantially rotationally-symmetrically in relation to the axis 40 press the anchor disc 41 in the direction of the brake disc 38 with the brake pads 39. The brake 34 is engaged in the non-powered-up state since the anchor disc 41 is pressed against the brake disc 38 such that the holding torque of the brake 34 is applied to the motor shaft 33 which in particular results from the brake size and the force of the pressure springs 42. If the brake 34 is engaged, a rotation of the motor shaft 33 is blocked. The brake 34 is opened or released by a control device 46 applying a voltage $U_0$ to the coil 47 of the electromagnet 43 by means of a voltage source 48 schematically represented. By applying the voltage $U_0$ to the coil 47, the or a current $I_B$ flows into the coil 47 whereby it forms a magnetic field. The magnetic field acts against the pressure springs 42 whereby the anchor disc 41 is attracted and is moved along the axis 40 in the direction of the coil 47. The movement of the anchor disc 41 takes place until it abuts on the coil 47 or on a stop provided on the coil support 37 such that the brake disc 38 is fully released. If the brake 34 is opened or released, a rotation of the motor shaft 33 is released. The coil support 37 serves in the represented example on the one hand as a stop for the anchor disc 41 and on the other hand to receive the coil 47.

The control device 46 is connected to the coil 47 via electric lines 49. The voltage source 48 is actuated to apply the voltage $U_0$ to the coil 47 from a control device 50 comprising a digital computer by means of an electric switch device 51 represented schematically, the voltage $U_0$ being either a constant direct voltage or a direct voltage which comprises a constant activation voltage portion and an alternating voltage portion overlapping the latter. Alternatively or additionally, it is possible to overlap an alternating voltage portion by means of the switch device 51 of the direct voltage $U_0$ and/or to pulse the direct voltage $U_0$ or subject it to a pulse-width modulation. The current $I_B$ flowing in the coil 47 and/or the current intake of the coil 47 is measured via a current sensor 52 schematically represented depending on the time t. The current signal recorded as a result is guided to the control device 50 via an adaptation circuit 53 schematically represented which comprises software for determining desired information. The control device 46 is formed by the control unit 29 of the converter 21 according to this embodiment. Alternatively however, the control device 46 can also e.g. be provided separately to the control unit 29.

A current-time diagram of the electric current $I_B$ flowing through the brake 34 and a voltage-time diagram of the electric voltage $U_B$ applied to the brake 34 is discernible from FIG. 6, as emerges e.g. when switching the brake 34 on and off. In this case, the time is labelled with the letter t.

The voltage $U_0$ is applied to the coil 47 of the brake 34 at a time $t_0$ such that the current $I_B$ flowing through the coil 47 increases. The voltage $U_0$ is in this case greater than zero. The magnetic force caused by the current $I_B$ negates the force of the pressure springs 42 at the time $t_1$ such that the anchor disc 41 releases from the brake disc 38. During the movement of the anchor disc 41 in the direction of the coil 47, the current $I_B$ increases only slowly. At the end of the movement, i.e. as soon as the anchor disc 41 abuts on the coil 47 or the stop at a time $t_2$, a strong increase of the current $I_B$ takes place. The difference $t_2-t_0$ produces the activation time to open the brake 34 at the current operating conditions at that time. If the current $I_B$ is measured over a sufficiently long time interval $\Delta t_1$ including or beginning with the time $t_0$, the times $t_1$ and $t_2$ can be determined by analysing the shape of the current-time curve.

The voltage $U_B$ applied to the coil 47 of the brake 34 is set from $U_0$ to zero at a time $t_3$ such that the current $I_B$ flowing through the coil 47 decreases. The magnetic force caused by the current $I_B$ is decreased at the time $t_4$ to the force of the pressure springs 42 such that the anchor disc 41 releases from the coil 47 or the stop. During the movement of the anchor disc 41 in the direction of the brake disc 38, the current $I_B$ decreases only slowly. At the end of the movement, i.e. as soon as the anchor disc 41 abuts on the brake disc 38 at a time $t_5$, a strong decrease of the current $I_B$ takes place. The difference $t_5-t_3$ produces the activation time to close the brake 34 or to adopt the state of the brake 34 blocking a rotation of the rotor blade 8 at the current operating conditions at that time. If the current $I_B$ is measured over a sufficiently long time interval $\Delta t_2$ including or beginning with the time $t_3$, the times $t_4$ and $t_5$ can be determined by analysing the shape of the current-time curve.

A timeline is discernible from FIG. 7, the brake 34 blocking a rotation of the rotor blade 8 being actuated to open at a time $t_B$. The time $t_B$ corresponds in particular to the time $t_0$. The resting electromotor 20 is also actuated at a time $t_A$ to rotate the rotor blade 8. The chronological offset between the times $t_A$ and $t_B$ is labelled with $\Delta t_V$. if the response time of the electromotor 20 is known or negligible with respect to the activation time of the brake 34, a target value for the chronological offset $\Delta t_V$ can be determined from the difference $t_2-t_0$, possibly taking into account the response time of the electromotor 20. The currently applicable chronological offset $\Delta t_V$ can then be set by this target value such that an optimal setting for the chronological offset is produced. By optimally setting the chronological offset $\Delta t_V$, it can, on the one hand, be ensured that the brake 34 is released when the electromotor 20 applies the torque to rotate the rotor blade 8 and on the other hand it can be ensured that the brake 34 is still not released when the electromotor 20 has still not applied the torque to rotate the rotor blade. In this case, response time of the electromotor 20 is in particular understood as the time which lapses from actuation of the resting electromotor 20 to rotate the rotor blade 8 until applying the torque to rotate the rotor blade 8.

The invention claimed is:

1. Method for controlling a rotor blade adjustment device of a wind turbine or water hydroelectric powerplant, wherein the rotor blade adjustment device comprises a drive which is connected to a rotor blade which is subjected to a flow of wind or water and has the purpose of rotating the rotor blade about a rotor blade axis relative to a rotor hub on which the rotor blade is mounted so as to be rotatable about the rotor blade axis and an electromagnetic brake which is connected to the rotor blade and has the purpose of blocking rotation of the rotor blade about the rotor blade axis, wherein the brake is actuated in order to change its activation state at a brake activation time ($t_B$), and wherein the drive is actuated to change its driving state at a drive activation time ($t_A$) which has a predetermined chronological offset ($\Delta tv$) at the brake activation time ($t_B$), characterised in that an electric current ($I_B$) flowing through the brake is measured, the shape of a current-time curve resulting therefrom is evaluated and the chronological offset ($\Delta tv$) is newly determined and/or adapted depending on the result of this evaluation.

2. Method according to claim 1, characterised in that the chronological offset ($\Delta tv$) is changed after evaluating the shape of the current-time curve.

3. Method according to claim 1, characterised in that the electric current ($I_B$) flowing through the brake is measured continuously and/or over or a time interval ($\Delta t_1$), wherein the brake activation time ($t_A$) is at the beginning or within the time interval ($\Delta t_1$) and the time of the change of the activation state ($t_2$) is at the end or within the time interval ($\Delta t_1$).

4. Method according to claim 1, characterised in that the drive activation time ($t_A$) is after the brake activation time ($t_B$) by the chronological offset value ($\Delta t_V$).

5. Method according to claim 1, characterised in that the drive is actuated at the drive activation time ($t_A$) to rotate the rotor blade and the brake is actuated at the brake activation time ($t_B$) to release the rotor blade.

6. Method according to claim 1, characterised in that the brake blocks the rotor blade at the brake activation time ($t_B$) and the drive rests at the drive activation time ($t_A$).

7. Method according to claim 1, characterised in that the brake is connected to an electric voltage source at the brake activation time ($t_B$) which delivers the electric current ($I_B$).

8. Method according to claim 7, characterised in that the electric voltage ($U_0$) provided by the voltage source is a direct voltage.

9. Method according to claim 1, characterised in that the electromagnetic brake has a support, at least one brake disc, at least one anchor disc mounted on the support so as to be displaceable relative to the brake disc, one or a plurality of springs mounted on the support and pressing the anchor disc in the direction of the brake disc and at least one electromagnet which, in the powered-up state, moves the anchor disc away from the brake disc by way of a magnetic force against the force of the spring or springs or holds said anchor disc at a distance to the brake disc.

10. Method according to claim 9, characterised in that the electric current ($I_B$) increases up to a first time ($t_1$) located after the brake activation time ($t_B$) at which the magnetic force corresponds or approximately corresponds to the force of the spring or springs, in that the electric current ($I_B$) increases up to a second time ($t_2$) located after the first time ($t_1$) more slowly than between the brake activation time ($t_B$) and the first time ($t_1$) and in that the electric current ($I_B$) increases after the second time ($t_2$) more strongly than between the first time ($t_1$) and second time ($t_2$), wherein the difference between the second time ($t_2$) and the brake activation time ($t_B$) produces the activation time of the brake.

11. Method according to claim 1, characterised in that an activation time between a second time and an initial time ($t_2-t_0$) of the brake lapsing from the brake activation time ($t_B$) until the activation state is changed is determined by evaluating the shape of the current-time curve and the predetermined chronological offset ($\Delta tv$) is newly determined and/or adapted depending on this activation time ($t_2-t_0$).

12. Method according to claim 10, characterised in that the difference between the second time ($t_2$) and the brake activation time ($t_B$) is the activation time of the brake.

13. Method according to claim 1, characterised in that the evaluation of the shape of the current-time curve includes recognising regions of different increase and/or change speed of the current-time curve.

14. Method according to claim 12, characterised in that the electric current ($I_B$) is changed up to a first time ($t_1$) located after the brake activation time ($t_B$), is changed up to a second time ($t_2$) located after the first time ($t_1$) more slowly than between the brake activation time ($t_B$) and the first time ($t_1$) and is changed after the second time ($t_2$) more strongly than between the first and second time, wherein the chronological offset ($\Delta tv$) is newly determined and/or adapted depending on the difference between the second time ($t_2$) and the brake activation time ($t_B$).

15. Method according to claim 1, characterised in that at least two activation states are assigned to the brake, wherein the brake is engaged in a first activation state and is released in a second activation state.

* * * * *